INVENTOR.
ANTHONY J. HORNFECK
BY
Raymond D. Jenkins
ATTORNEY

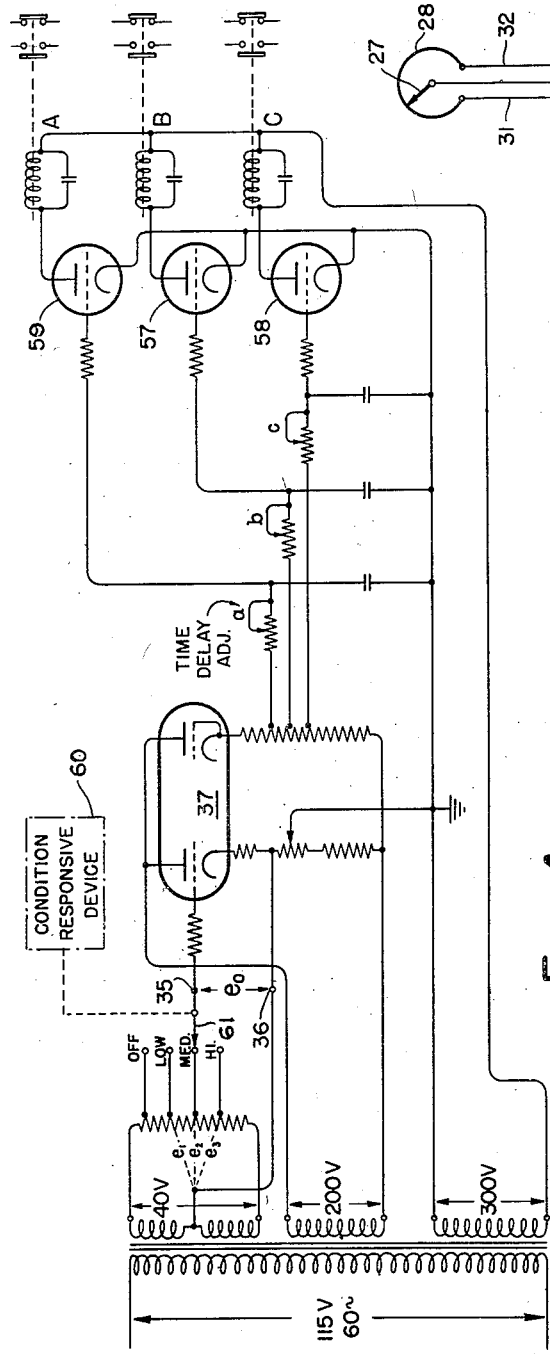
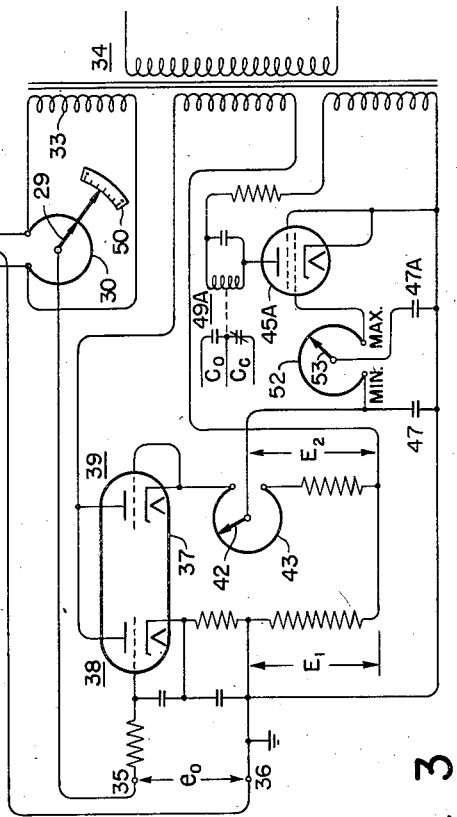
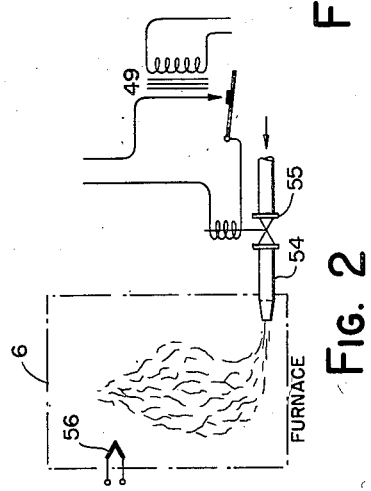

Patented Mar. 24, 1953

2,632,846

UNITED STATES PATENT OFFICE 2,632,846

ELECTRON CONTROL SYSTEM RESPONSIVE TO CHANGES IN A VARIABLE

Anthony J. Hornfeck, Cleveland Heights, Ohio, assignor to Bailey Meter Company, a corporation of Delaware Application December 8, 1945, Serial No. 633,891

16 Claims. (Cl. 250—27)

1

The present invention relates to measuring and/or control systems, particularly of the electronic circuit type. A condition, quantity, position or other variable which may be represented by an electrical resistance value, potential, or other electrical characteristic may be continuously and instantaneously measured through the agency of the circuit to be described. The measurement so obtained may be used to effect a control of the same or of another variable which may or may not contribute to the magnitude or change in magnitude of the variable being measured.

Specifically my present invention provides improvements in an electronic relay or in a relay combining mechanical, electrical and electronic features.

I have chosen to illustrate and describe my invention in connection with preferred arrangements and modifications as repersentative only and not limited thereto.

In the drawings:

Fig. 2 is a modification of Fig. 1 in the control of a furnace.

Fig. 3 is a wiring diagram of the relay of Fig. 1 embodying a modification thereof.

Fig. 4 is a wiring diagram of a multipoint electronic relay.

Figure 1:
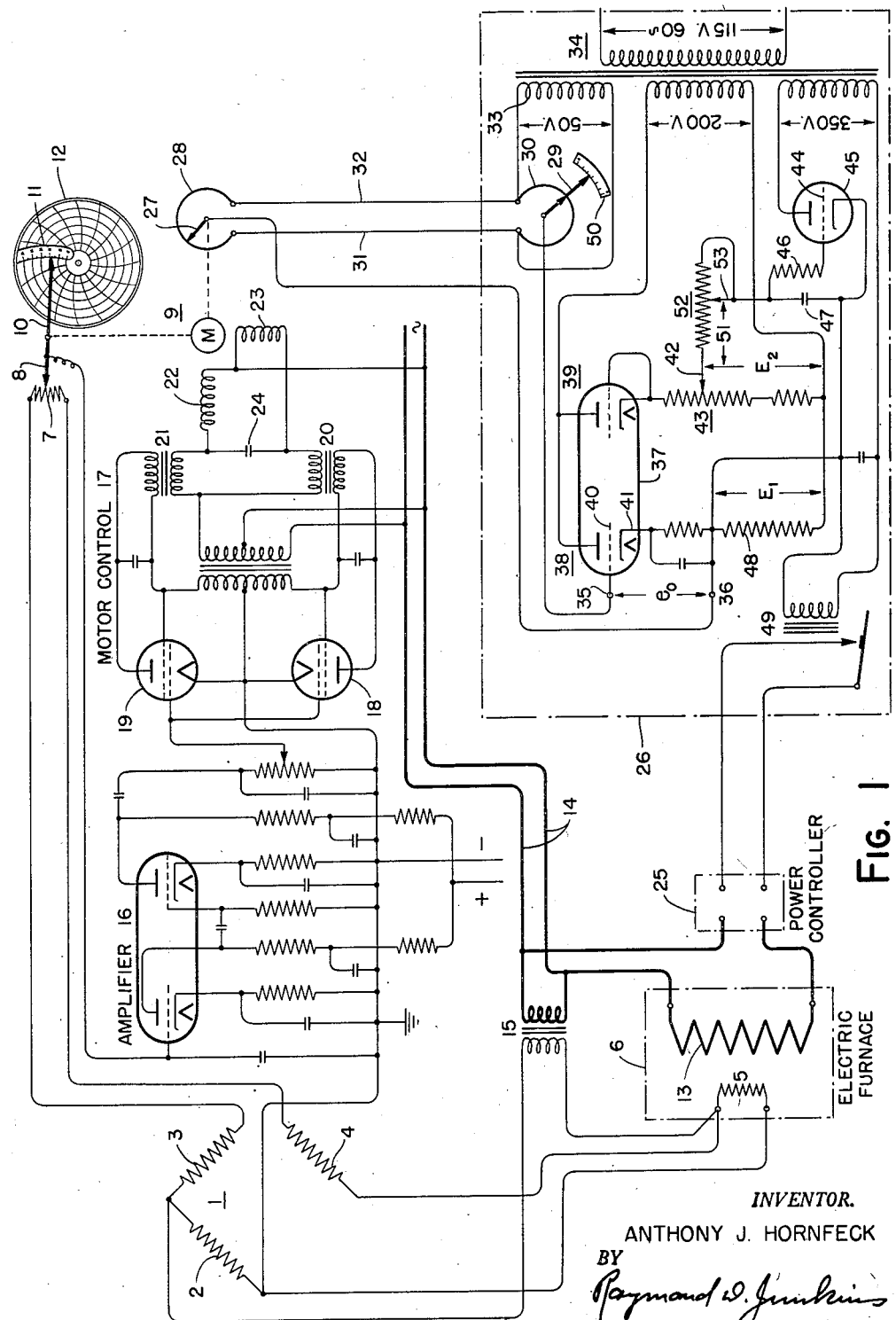
Fig. 1 is a measuring and control system in connection with a resistance thermometer.

All of the figures of the drawing are shown in quite diagrammatic or schematic manner. In Fig. 1 I have shown the amplifier and motor control circuit in detail. I have not felt it necessary to duplicate these details in the other figures which illustrate modifications of a portion only of the complete circuit of Fig. 1.

Referring now in particular to Fig. 1, I indicate at 1 a phase sensitive alternating current bridge having fixed resistor arms 2, 3 and 4. The fourth arm 5 of the bridge 1 is a resistance element located in an electric furnace 6 and sensitive to the temperature thereof. For balancing the network I provide an adjustable resistance 7 inserted between the arms 3 and 4 and provided with a movable contact arm 8 for proportioning the resistance 7 between the arms 3 and 4.

For positioning the contact arm 8 I provide a motor 9 which also positions an indicator 10 relative to a scale 11 and relative to a revoluble chart 12, thereby providing an instantaneous indication as well as a continuous record of the value of temperature to which the resistance arm 5 is sensitive.

2

The electric furnace 6 is preferably heated by an electric resistance element 13 receiving current from an alternating current source 14, which also provides alternating current supply to the bridge 1 through a transformer 15.

Preferably, the bridge arm 5 is a platinum resistance measuring element. The conjugate corners of the bridge 1 are connected to an amplifier 16 and motor control 17 for the motor 9. For an understanding of a phase sensitive alternating current bridge for measuring the resistance of the leg 5 subjected to temperature of the furnace 6, reference may be had to the Ryder Patents 2,275,317 and 2,333,393. The conjugate voltage supplied to the amplifier 16 assumes a balance or unbalance and a phase relation relative to the supply voltage dependent upon the magnitude and sense of the unbalanced condition of the bridge. The amplifier 16 selectively controls motor tubes 18, 19 which in turn control the amount and direction of unbalance of saturable core reactors 20 and 21 for directional and speed control of the motor 9 adapted to position the arms 8 and 10.

The motor 9 is of an alternating current type having windings 22 and 23 ninety electrical degrees apart and also having a capacitor 24. When alternating current passes directly through one of the windings, and simultaneously through the other winding in series with the capacitor, the motor rotates in predetermined direction and at a speed determined by the extent of unbalance of the saturable core reactors 20, 21. It is not necessary to go into greater detail as to the construction and operation of the amplifier 16 and the motor control circuit 17, as reference may be had to the above mentioned Ryder patents.

In my present invention, in addition to providing an instantaneous indication and a continuous record of the value of temperature to which the arm 5 is subjected, I provide an electrical control of the heat input of the resistor 13 to the electric furnace 6. I have shown in this connection a power controller 25 which forms no part of the present invention. This may be any adaptable power controller for the resistor 13. My present invention resides in a mechanical-electronic relay system 26, intermediate the measuring system and a power controller, sensitive to the measuring system and for turning on and off the power controller 25. Thus upon departure of temperature within the furnace 6 from that which is desired, the power controller 25 is turned on or off to increase or decrease the heat of the furnace, tending to return the departed temperature to its desired value. The actual temperature is continuously indicated on the scale 11 and recorded on the chart 12.

I have shown the relay system 26 enclosed in a dash line to indicate that it is preferably housed in some sort of a container or casing independently of the measuring circuit, electric furnace or the power controller, and preferably at a location convenient to the power controller, which location may be remote from the measuring and recording instrument.

The motor 9, positioning the contact arm 8, simultaneously positions a contact arm 27 over a slide wire 28. At 29 I indicate a contact arm adapted to be manually positioned along a slide wire 30 for establishing the temperature standard to which the control works, i. e. the temperature value which is desirably to be maintained at the sensitive arm 5.

The elements 27, 28, 29 and 30 comprise what I term a balanceable control bridge including the joining conductors 31, 32. This circuit is supplied with alternating current power through the secondary winding 33 of a transformer 34. Contact arm 27 is positioned relative to the slide wire 28 by the motor 9 representative of actual temperature to which the resistance arm 5 is sensitive. The contact arm 29 is positioned relative to slide wire 30 manually to a point representing the desired temperature. The control circuit including these elements then establishes a signal $e_0$ across the terminals 35, 36 of reversible phase and having a magnitude proportional to the unbalance of the control circuit.

The operation is as follows. If temperature within the furnace deviates from the desired value then the resistance of the bridge arm 5 changes, causing an unbalance of the bridge 1 in one direction or the other, dependent upon whether the actual temperature is above or below the desired temperature. The phase and magnitude of the A.-C. output of the bridge 1 follows the sense and amount of unbalance of the bridge and is applied to the amplifier 16 for control of the motor 9. The motor 9 rotates in predetermined direction an amount determined by the phase and amount of unbalance of the bridge 1 and positions the contact 8 along the slide wire 7 in proper direction to rebalance the bridge. The amount of movement of the contact 8 over the slide wire 7 to bring about such a rebalancing is representative of the deviation of the actual temperature from the desired temperature, and therefore the indicator 10 continuously shows on the index 11 and chart 12 the actual temperature of the furnace.

At the same time the motor 9 has positioned the contact 27 along the slide wire 28 in consonance with the departure of the temperature from the desired temperature. With such movement of the contact arm 27 the control bridge including the elements 27, 28, 29, 30, 31 and 32 becomes unbalanced and an electrical value $e_0$ is established across the terminals 35, 36 representative of the direction and extent of such unbalance. Such signal is effective to actuate the relay 26 controlling the resistor 13 through the agency of power controller 25 in a direction to return the temperature of the furnace toward the desired standard.

As the temperature (due to a change in heating of the resistor 13) returns toward desired value, the consequent temperature change at the resistance 5 unbalances the bridge 1 and causes the motor 9 to position the contacts 8 and 27 in proper direction and amount until the measuring bridge 1 and the control bridge are again balanced. It is appreciated, of course, that this action may be more or less continuous, i. e. before the temperature returns completely to its desired standard there may be other influences acting upon the furnace to prevent or to accelerate the return of the temperature to the desired value. In other words, the measuring circuit is continuously indicating the instantaneous temperature of the furnace and the control circuit is continuously regulating the power controller 25 to maintain the temperature at the desired value or standard. I will now describe the operation of the apparatus within the dotted disclosure 26. Such apparatus is under the control of the signal $e_0$ for regulating the power controller 25.

The magnitude of the control impulse is proportional to the deviation of the measured quantity from the control setting. The sense of the unbalance depends on whether the deviation is below or above the control setting and determines the phase or the polarity of the control impulse. This impulse is amplified or applied directly to the controller. The direction in which the controller operates to restore the measured quantity to standard is determined by the phase or polarity of the unbalance of the control bridge. A phase discriminatory device 37 is shown conveniently as a single envelope tube containing triodes 38 and 39 of which 39 is connected as a rectifier whose function is to supply a reference D.-C. voltage $E_2$ for 38. The voltage $e_0$ at terminals 35, 36 is impressed between the grid 40 and cathode 41 of triode 38 controlling a D.-C. voltage $E_1$ to be compared to $E_2$. The anode-cathode circuits of the tubes 38 and 39 are energized in parallel from an additional secondary on transformer 34 to provide proper phasing.

When the control bridge is in balance, i. e. when temperature (as represented by the relative position of 27, 28) is at the desired value (as represented by the relative position of 29, 30) $e_0=0$ and triode 38 conducts a predetermined amount of current resulting in a voltage drop $E_1$ in cathode resistor 48. An adjustable contact 42 may be so positioned along cathode resistance 43 for rectifier 39 that $E_2$ is slightly less than $E_1$ when $e_0=0$. The voltage difference between $E_1$ and $E_2$ is most negative at 42 and is applied to the grid 44 of a gas-filled tube 45, such as a thyratron through a resistor 46 and a capacitor 47. The voltage thus applied to the grid of the thyratron 45 is preferably just negative enough to prevent 45 from firing. The power supply for the gas type rectifier 45 is shown as from an additional secondary on transformer 34 but since the grid 44 is supplied with direct current an entirely separate source of power may be applied to the tube 45. It might well be of commercial frequency while a higher frequency could with advantage be used for the measuring and control circuits.

Inasmuch as the relay being described provides an on-off control of the heating element 13 it will be appreciated that I desire to fire tube 45 and energize a mechanical relay 49 for the power controller 25 only when the temperature tends to fall below the desired standard value. When the temperature increases above standard or desired value the tube 45 does not fire or conduct because the unbalance voltage $e_0$ is in phase with the plate voltage of triode 38 and gives an increase in plate current over balanced condition. This results in an increased voltage drop $E_1$ across resistor 48 and a more negative potential on grid 44.

When the temperature decreases from standard the control bridge becomes unbalanced and a voltage $e_0$ available across terminals 35, 36 is applied to the grid 40 of discriminator triode 38. Such voltage is out of phase with the plate voltage of 38, so that the plate current is reduced and $E_1$ becomes less than at balance. This reduces the negative voltage applied to the grid of thyratron 45 which fires completing the circuit to energize relay 49.

Thus the relay 26 is sensitive to the phase of the voltage $e_0$ or to the direction of unbalance of the control bridge, which is the same as saying that the relay 26 is sensitive and responsive to a departure of actual temperature above or below the desired value of temperature. The system comprises an on-off control. When temperature decreases below the desired value then the thyratron 45 is fired, the relay 49 is energized, and the power controller 25 is so activated as to increase the heat applied to the furnace 6 so that the actual temperature effective at 5 will be raised toward the desired value. If the temperature increases above the desired value, the control bridge becomes unbalanced in opposite sense, applying a voltage $e_0$ of opposite phase to the relay circuit 26, thereby shutting off the thyratron 45 to produce a reduction in the heat applied to the furnace 6.

The "control point" as it is sometimes termed in this art is the desired or "standard" temperature value indicated on a scale 50 by hand adjustment of the contact pointer 29 along the slide wire resistance 30.

It will be appreciated that in the operation of a furnace there may be a sudden temporary drop in temperature, such as would be caused by the opening and shutting of a door in the furnace wall. As such a temperature change is momentary only and is not indicative of a trend, it is desired that the control system disregard all changes in temperature whose duration is less than a predetermined time interval. I have, therefore, arranged the circuit so that such a sudden temperature drop of a short duration will be ineffective to fire the tube 45. The tendency, of course, will be to fire the tube, but the voltage across the condenser 47 cannot change as fast as does the voltage difference between $E_1$ and $E_2$ due to the fact that the condenser 47 holds its charge and tends to maintain its voltage in known manner. The voltage across condenser 47 changes at a rate which is determined by the size of 47 and the portion 51 of a resistance 52 between the contact arm 53 and the contact arm 42. I thus designate the contact 53 as a "time delay adjustment" and provide that manually the contact 53 may be moved along the resistor 52 to adjust the time duration of decreases in temperature which are ineffective to fire the tube 45. Basic values of the capacitor 47 and the resistance 52 give a ready possibility of a 20 to 1 range in time delay adjustment. For example, it is quite commercially possible that temperature decreases of a duration of two, five, ten or possibly greater number of seconds will be considered as being temporary decreases only and will be ineffective to fire the tube 45. As previously mentioned, these time intervals are adjustable manually by moving the contact 53 along the resistance 52 and thus varying the value of the included resistance 51.

In this art it is common to refer to the "dead band" of a controller or controlling instrument. By this is meant the portion of the range of the instrument through which temperature may vary without effecting an actuation of the control. For example, assume that the range of the measuring controller is 0 to 1000° F. Assume the "control point" or standard desired temperature is 500° F. A desirable "dead band" might for example be the temperature between 499° F. and 501° F., a "dead band" of 2° F. Usually the possibility exists of moving the "dead band" without change along with the control point. This means that a dead band of 2° F. would exist across a control point of 450° F., 500° F., 700° F., or substantially any selected control point in the given range of 0 to 1000° F. Under certain conditions of mechanical or circuit arrangement the dead band may vary slightly in width at different points in the measuring range. For the purpose of explanation, however, I assume that the dead band will remain substantially uniform across whatever control point is selected in the range of the instrument.

It will be appreciated that if the dead band is substantially non-existent then the slightest variation in temperature in one direction or the other from the control point of 500° F. will result in an actuation of the relay 49 and an undesirable chattering of said relay may occur when temperature remains almost exactly on the desired value. It is desired that a dead band exist so that the temperature must depart a slight amount from the standard value before the relay 49 is energized or deenergized. The actual width of the dead band selected will depend, of course, upon the characteristics of the system in relation to how close the temperature of the furnace 6 must be maintained.

In Fig. 1 I indicate a resistor 46 in the grid circuit of the thyratron 45. If the value of resistor 46 is large, I get substantially no dead band, but I can introduce a dead band or increase it in value by decreasing the value of the resistor 46. This may readily be accomplished by substitution of fixed resistors and usually it is not necessary to change the value of the dead band for any given measuring controller after it is first installed and adjusted to the operating conditions desired in the furnace. In other words, in many instances it is not necessary or desirable to have the dead band adjustment readily changeable manually where it could be changed by unauthorized persons.

In Fig. 2 I show a modification to the extent that the furnace 6 may be fired by a fuel, such as gas, admitted through a burner 54 under the control of a solenoid or other motor actuated regulating valve 55 controlled by the relay 49. Furthermore, a temperature sensitive thermocouple 56 may be substituted for the resistance thermometer element 5. In this arrangement obviously the bridge 1, amplifier 16 and motor control 17 for use with the resistance element 5 would be replaced by the proper measuring and motor control circuit sensitive to potential developed by the thermocouple 56 and for control of the motor 9. Such a measuring and motor control circuit is disclosed and claimed in my copending application Serial No. 544,586, now Patent No. 2,447,338.

In Fig. 3 I show the relay circuit 26 with slight modifications over that as shown in Fig. 1; consisting principally of modifications resulting in a more commercial type of arrangement than the relatively schematic arrangement of Fig. 1. Herein I preferably show the gas tube 45A as a gas tetrode having a shield grid. This may be a commercial No. 2050 or GL-502. The capacitor 47A provides inherently some time delay, i. e. enough to keep the relay from chattering.

Adjustable resistance 52 having a contact arm 53 connected to capacitor 47A represents a sensitivity adjustment of a commercial range of approximately .05 to 2.0% of the temperature range of the instrument. The "dead band" and time delay are maximum when contact arm 53 is at MAX end of resistor 52 and minimum when contact arm 53 is at MIN end of resistor 52. Thus, for example, if the instrument has a range of 0 to 1000° F. the sensitivity adjustment 53, 52 may be used to vary the dead band from say .5° F. to 20° F. In other words, a dead band value between .50° F. and 20° F. may be selected and will be effective across the "control point," which latter is selected by the elements 29, 30. Capacitor 47A is ordinarily small, say .05 mfd. so that it does not introduce appreciable time delay. However, if a wide range of "dead band" adjustment and time delay are desired capacitor 47A and resistor 52 can be made large.

I show the relay 49A as being slightly different than the relay 49 of Fig. 1. Obviously the relay 49 may have a normally opened or a normally closed contact, or a plurality of contacts as desired. The relay 49A has been shown as having a normally open contact Co and a normally closed contact Cc. Such arrangement of normally open or closed contacts will be selected to adapt the circuit arrangement to the necessary apparatus to be controlled, such for example as the power controller 25 or the solenoid or motor driven valve 55, or other heat regulating apparatus.

It is apparent that the relay 26 is not limited to being sensitive for actuation to a measurement of temperature in a furnace or otherwise, but the control bridge may be under the control of or sensitive to any variable condition, position or the like to be controlled. In like manner the relay 26 may actuate control mechanism which bears any or no relation to the variable, condition or value used to actuate the relay. In other words, the relay 26 comprises an arrangement sensitive to phase of an applied voltage $e_0$ for firing the thyratron under certain predetermined conditions.

With the arrangement of Fig. 3 a double acting relay or a pair of relays may be operated from the same circuit so that one closes on a signal of one phase and the other on a signal of opposite phase. This might, for example, be used to operate a reversing motor control.

In Fig. 4 I diagrammatically illustrate a modification particularly adapted to the sequential energization of mechanical relays through electronic circuit means.

In some applications it may be desired to operate the electronic type relay from one or more sets of mechanically positioned contacts. Such contacts are located in the grid circuit of the relay control tube, hence their current and power interrupting capacity can be very small. The control mechanism designated "condition responsive device" 60 (Fig. 4) may be a measuring device, as for example a diaphragm, bellows, Bourdon tube, or the like.

The elementary diagram of such a sequence of multi-point relay circuits is shown in Fig. 4.

The individual relays can be independently timed and interlocking between relays can be used if necessary in the particular application.

The condition responsive device 60 is adapted to mechanically position a contact arm 61 to engagement with any one of four terminals designated respectively "Off," "Low," "Med," and "Hi." When the contact 61 engages the "Off" terminal a voltage $e_0$ exists across the terminals 35, 36. When engaging the contact "Low" the voltage may be designated as $e_1$; at "Med" a voltage $e_2$ and at "Hi" a voltage $e_3$. Thus selectively a voltage $e_0$, $e_1$, $e_2$ or $e_3$ may be impressed across the terminals 35, 36 for control of the discriminator tube 37 and selective control of firing of thyratron 59, 57 or 58. Time delay adjustments $a$, $b$, $c$ are available in the respective circuits of the tubes 59, 57 and 58 controlling the mechanical relays A, B, C. The sequence of operation is as follows:

Contact 61 on "Off"—all relays deenergized.
Contact 61 on "Low"—relay A energized.
Contact 61 on "Med"—relays A and B energized.
Contact 61 on "Hi"—relays A, B and C energized.

In a system of this sort the three relays A, B and C may be useful in sequential connecting of a plurality of heating resistors 13, or the selective connecting of different transformer taps, or in the control of a three-speed motor. Obviously the relays A, B and C may have multi-contacts of desired combination in open or closed normal condition.

It will be appreciated that I have illustrated and described only certain preferred embodiments of my invention and that I do not desire to be limited to these specific forms.

What I claim as new, and desire to secure by Letters Patent of the United States, is:

1. In a system for energizing a load device comprising in combination, a thyratron type tube having its output circuit connected to a current source for load energization, a control grid and a cathode for said tube; means to control the potential of said grid to control conduction of said tube, including a discriminator tube and a fixed output tube, means to adjust the potential of the grid of the discriminator tube, a load impedance in the output circuit of each of said last mentioned tubes, a source of energy supplied to said impedances and their tubes in parallel, a point on the discriminator tube impedance near its negative end being connected to the cathode of the thyratron, and a point on the impedance of the fixed output tube, which has a potential in respect to the thyratron cathode just sufficiently negative to prevent conduction of the thyratron when the grid of the discriminator is normal, being connected to the grid of the thyratron, whereby a decrease in grid potential of the discriminator tube increases the potential of the thyratron grid and causes conduction in the tube.

2. The system defined in claim 1 which includes a condenser connected between the grid and cathode of the thyratron and having sufficient capacity to provide a time-delay in the operation of the tube, a discharge circuit for said condenser and an adjustable impedance in said circuit to regulate the time-delay.

3. The system defined in claim 1 which includes a high resistance connected in series between the thyratron grid and the said point on the impedance of the fixed output tube.

4. In a system for selectively energizing a plurality of load devices comprising in combination, a thyratron type tube for each device and having its output circuit connected to a current source for energizing a load; a control grid and cathode for each tube; means to control the potentials on said grids to control conduction of the tubes, including a single discriminator tube and a single fixed output tube; means to adjust the potential on the grid of the discriminator tube throughout a range; parallel-energized load impedances one in the output circuit of each of said last mentioned tubes, a connection between the negative end of the discriminator tube load impedance and the cathode of each thyratron, and means connecting spaced taps on the load impedance of the fixed output tube respectively to the thyratron grids, each of said taps having a potential sufficiently negative to prevent its thyratron conducting when the potential on the grid of the discriminator tube is sufficiently positive, increasing negative potential on the discriminator tube grid causing successively conduction by the thyratrons.

5. In a system for selectively energizing a plurality of load devices comprising in combination, a thyratron type tube for each device and having its output circuit connected to a current source through its load; a control grid and cathode for each tube; means to control the potentials on said grids to control conduction by the tubes, including a single discriminator tube and a single fixed output tube; means to adjust the potential on the grid of the discriminator tube throughout a range; parallel-energized load impedances one in the output circuit of each of said last mentioned tubes, a connection between the negative end of the discriminator tube load impedance and the cathode of each thyratron, means connecting spaced taps on the load impedance of the fixed output tube respectively to the thyratron grids, each of said taps having a potential sufficiently negative to prevent its thyratron conducting when the potential on the grid of the discriminator tube is sufficiently positive, increasing negative potential on the discriminator tube grid successively effecting conduction by the thyratrons, and a condenser for each thyratron shunting grid to cathode and of sufficient capacity to provide a time-delay in the conduction of the tube after the potential for grid control is changed to conduction value.

6. A control system comprising, in combination, a balanceable bridge including two potentiometers connected in a closed loop and connected at their junction points to a source of A.-C., a slider for each of said potentiometers, means for positioning one of said sliders in response to changes in a variable condition, means for adjusting manually the other of said sliders, a discriminator tube having its input connected to said sliders, a fixed output tube, means for energizing the output circuits of said tubes in parallel from a source of A.-C., a load impedance connected in the output circuit of each of said tubes, a thyratron type tube having an anode, a cathode, and a control grid, a connection between the cathode of said thyratron and a point on the impedance in the output circuit of the discriminator tube near the cathode of the latter, means connecting the grid of said thyratron to a tap on the impedance in the output circuit of said fixed output tube, an electrically operated device for controlling the variable condition, and means for connecting said device through the output circuit of said thyratron to a source of A.-C.

7. A control system comprising in combination; a thyratron type tube, an output circuit for said tube connected to a current source through a device to be actuated, a control grid and cathode for said tube, means to control the potential of said grid to control conduction of the tube, including a discriminator tube and a fixed output tube, means responsive to a variable for adjusting the potential of the discriminator grid, parallel-energized load impedances, one in the output circuit of each of said last mentioned tubes, a connection between the negative end of the discriminator load impedance and the cathode of said thyratron, an adjustable tap on the load impedance of said fixed output tube, means connecting said tap to the grid of said thyratron and including a resistor, a tap on said resistor, and a condenser interposed between said resistor tap and the cathode of the thyratron, said impedance tap being manually positioned to prevent conduction by the thyratron when the grid potential of the discriminator tube is normal.

8. A control system comprising in combination; a thyratron type tube, an output circuit for said tube connected to a current source through a device to be actuated, a control grid and cathode for said tube, means to control the potential of said grid to control conduction of the tube, including a discriminator tube and a fixed output tube, means responsive to a variable for adjusting the potential of the discriminator grid, parallel-energized load impedances, one in the output circuit of each of said last mentioned tubes, a connection between the negative end of the discriminator load impedance and the cathode of said thyratron, an adjustable tap on the load impedance of said fixed output tube, means connecting said tap to the grid of said thyratron and including a resistor, a tap on said resistor, a condenser interposed between said resistor tap and the cathode of the thyratron, and a second condenser between said cathode and said first tap, said second condenser having sufficient capacity to provide time-delay in the conduction of said thyratron after the grid control voltage is brought to conduction value.

9. A control system comprising in combination; a thyratron type tube, an output circuit for said tube connected to a current source through a device to be actuated, a control grid and cathode for said tube, means to control the potential of said grid to control conduction of the tube, including a discriminator tube and a fixed output tube, means responsive to a variable for adjusting the potential of the discriminator grid, parallel-energized load impedances, one in the output circuit of each of said last mentioned tubes, a connection between the negative end of the discriminator load impedance and the cathode of said thyratron, an adjustable tap on the load impedance of said fixed output tube, and means connecting said tap to the grid of said thyratron and including a resistor, a condenser connected from said tap to the thyratron cathode and of a capacity to provide time-delay in the conduction of the thyratron, said load impedances in series constituting a discharge circuit for said condenser.

10. A control system comprising in combination; a thyratron type tube, an output circuit for said tube connected to a current source through a device to be actuated, a control grid and cathode for said tube, means to control the potential of said grid to control conduction of the tube, including a discriminator tube and a fixed output tube, means responsive to a variable for adjusting the potential of the discriminator grid, parallel-energized load impedances, one in the output circuit of each of said last mentioned tubes, a connection between the negative end of the discriminator load impedance and the cathode of said thyratron, an adjustable tap on the load impedance of said fixed output tube, means connecting said tap to the grid of said thyratron and including a resistor, a condenser connected from said tap to the thyratron cathode and of a capacity to provide time-delay in the conduction of the thyratron, said load impedances in series constituting a discharge circuit for said condenser, and a portion of the discriminator tube load impedance being used for providing a bias for the grid of the said discriminator tube.

11. A control system comprising in combination, a shielded grid thyratron, load means to be electrically actuated connected to a source of current and the output circuit of the tube, a control grid and cathode for said tube, grid potential control means for the tube comprising a triode and a diode, means responsive to a variable for adjusting the effective potential of the triode grid, a load impedance connected in the output circuit of the triode, a load impedance connected in the output circuit of the diode, a source of current energizing said impedances in parallel in their respective diode and triode circuits, a connection from the thyratron cathode to the triode cathode, a connection from a tap near the negative end of the diode load impedance to the grid of said thyratron, a resistor in said last mentioned connection, and a condenser between said tap and the thyratron cathode of a capacity to provide time-delay in the conduction of the thyratron after its grid control potential has been properly adjusted therefor.

12. The system of claim 11 in which the position of the said tap is adjustable for determining the relationship of the triode grid potential to the conduction potential of the thyratron.

13. An amplifying system of the type described comprising in combination, an amplifier tube having an anode, a cathode and grid, an alternating current potential energizing said anode and cathode, a resistor in the anode-cathode circuit, the circuit components providing a predetermined anode current when the external grid control voltage is zero, a rectifier tube having an anode, a grid and a cathode, a resistor and said alternating current potential connected in circuit with said rectifier anode and cathode, circuit means providing a constant potential on said rectifier grid to effect a constant potential across the rectifier resistor, a circuit combining said resistors in series in voltage opposition, a single output circuit from the cathode ends of said resistors, and means to deliver a grid control voltage to the amplifier tube having a range in each direction from zero.

14. The amplifying system as defined in claim 13 in which a capacitor is provided across the output circuit to reduce the sensitivity of the amplifier to transient grid potential excursions, both said resistors being included in a discharge circuit for said capacitor and means in said system to adjust the rate of discharge of said capacitor.

15. An electronic control system including in combination, a three-element gas-type tube having an alternating current energized output circuit including a translating device, means to control the potential of the tube grid to control conduction of the tube, said means including a three element amplifier tube, an impedance for the output circuit of said amplifier tube, an alternating current energizing said circuit and impedance, the circuit components of said amplifier tube being arranged to produce an output current of average value when the external grid control voltage for said amplifier is zero, a source of constant potential of the order of that appearing in said impedance under said stated conditions, a circuit combining the impedance potential and that of said source in voltage opposition, means applying the difference potential of said combining circuit to the gas-type tube grid, means to deliver a control voltage to the grid of said amplifier having a range in each direction from zero whereby the conductivity of the gas-type tube is controlled in accordance with the direction of deviation of the amplifier grid voltage from zero, additional means to provide a time delay in said conductivity control, said additional means comprising a condenser shunting the grid and cathode of the gas-type tube and an adjustable discharge circuit for said condenser for determining the amount of said time delay.

16. The system as defined in claim 15 wherein the said impedance in the output circuit of the amplifier tube is included in the adjustable discharge circuit for said condenser.

ANTHONY J. HORNFECK.

REFERENCES CITED

The following references are of record in the file of this patent:

UNITED STATES PATENTS

| Number | Name | Date |
|---|---|---|
| 2,095,124 | Cockrell | Oct. 5, 1937 |
| 2,175,889 | Forbes | Oct. 10, 1939 |
| 2,306,784 | Lord | Dec. 29, 1942 |
| 2,325,232 | Davis | July 27, 1943 |
| 2,325,308 | Davis | July 27, 1943 |
| 2,326,313 | Trucksess | Aug. 10, 1943 |
| 2,331,418 | Nolde | Oct. 12, 1943 |
| 2,349,437 | Keeler | May 23, 1944 |
| 2,349,849 | Deal | May 30, 1944 |
| 2,368,093 | Asset et al. | Jan. 30, 1945 |
| 2,383,806 | Kubler | Aug. 28, 1945 |
| 2,388,812 | Albin | Nov. 13, 1945 |
| 2,403,609 | Perkins | July 9, 1946 |
| 2,415,167 | Gieseke | Feb. 4, 1947 |
| 2,419,001 | Badmaieff | Apr. 15, 1947 |
| 2,420,188 | Olving | May 6, 1947 |
| 2,437,951 | Godet | Mar. 16, 1948 |